US005744517A

United States Patent [19]
Chung

[11] Patent Number: 5,744,517
[45] Date of Patent: Apr. 28, 1998

[54] POLYCARBONATE COMPOSITIONS RESISTANT TO IONIZING RADIATION

[75] Inventor: James Y. J. Chung, Wexford, Pa.

[73] Assignee: Bayer Corporation, Pittsburgh, Pa.

[21] Appl. No.: 717,388

[22] Filed: Sep. 20, 1996

Related U.S. Application Data

[63] Continuation of Ser. No. 407,933, Mar. 21, 1995.

[51] Int. Cl.[6] .............................. C08L 69/00; C08K 5/12
[52] U.S. Cl. ........................ 523/136; 524/285; 524/295; 524/296; 524/298
[58] Field of Search ........................ 523/136; 524/285, 524/295, 296, 298

[56] References Cited

U.S. PATENT DOCUMENTS

| | | | |
|---|---|---|---|
| 3,836,490 | 9/1974 | Bockmann . | |
| 4,624,972 | 11/1986 | Nace | 523/136 |
| 4,804,692 | 2/1989 | Lundy et al. | 523/137 |
| 4,873,271 | 10/1989 | Lundy et al. | 523/136 |
| 4,874,802 | 10/1989 | Lundy et al. | 524/94 |
| 4,963,598 | 10/1990 | Krishnan et al. | 523/137 |
| 5,006,572 | 4/1991 | Lundy et al. | 523/136 |
| 5,187,208 | 2/1993 | Rodenhouse | 523/136 |
| 5,187,211 | 2/1993 | Lundy et al. | 524/107 |
| 5,214,078 | 5/1993 | Powell et al. | 523/136 |
| 5,274,009 | 12/1993 | Grigo et al. | 523/137 |
| 5,280,050 | 1/1994 | Powell et al. | 523/136 |
| 5,476,893 | 12/1995 | Lundy et al. | 524/288 |

FOREIGN PATENT DOCUMENTS

| | | |
|---|---|---|
| 152012 | 8/1885 | European Pat. Off. . |
| 158822 | 10/1985 | European Pat. Off. . |
| 83/00493 | 2/1983 | WIPO . |

Primary Examiner—David Buttner
Attorney, Agent, or Firm—Joseph C. Gil; Aron Preis

[57] ABSTRACT

A thermoplastic polycarbonate molding composition resistant to ionizing radiation is disclosed. Accordingly, a composition containing a polycarbonate resin and an effective amount of an ester based on an aromatic carboxylic acid and at least one member selected from the group consisting of secondary alcohol, benzyl alcohol and tertiary alcohol was found to be resistant to the yellowing which characterizes polycarbonate compositions exposed to ionizing radiation.

2 Claims, No Drawings

POLYCARBONATE COMPOSITIONS RESISTANT TO IONIZING RADIATION

This application is a continuation of application Ser. No. 08/407,933 filed Mar. 21, 1995.

FIELD OF THE INVENTION

The invention relates to thermoplastic molding compositions and in particular to polycarbonate compositions which are rendered resistant to ionizing radiation.

SUMMARY OF THE INVENTION

A thermoplastic polycarbonate molding composition resistant to ionizing radiation is disclosed. Accordingly, a composition containing a polycarbonate resin and an effective amount of an ester based on an aromatic carboxylic acid and at least one alcohol selected from a secondary alcohol, tertiary alcohol and benzyl alcohol was found to be resistant to the yellowing which normally characterizes polycarbonate compositions exposed to ionizing radiation.

BACKGROUND OF THE INVENTION

Because of their physical and mechanical properties, polycarbonate resins were found to be eminently suitable for a variety of applications in the medical field. However, those applications which require sterilization by exposure to ionizing radiation present a problem since polycarbonate tends to yellow and show increased haze. The relevant art is noted to include U.S. Pat. No. 4,624,972 which disclosed polycarbonate compositions resistant to gamma radiation containing an ester of an aromatic polycarboxylic acid and a monoalkyl or monoaryl ether of polyglycol. The properties of relevant compositions containing esters based on primary alcohols are disclosed in the '972 document (column 5). U.S. Pat. No. 4,873,271 disclosed a gamma radiation resistant polycarbonate composition containing an ester of a poly(alkylene)oxide as a stabilizer. Also relevant are the following U.S. patents all of which relate to polycarbonate compositions rendered resistant to gamma radiation by the incorporation of a stabilizing agent: U.S. Pat. Nos. 5,187,211; 4,804,692; 4,963,598; 4,874,802; 5,006,572; 5,187,208; 5,274,009 and 5,214,078. Lastly, U.S. Pat. No. 5,280,050 disclosed a polycarbonate composition containing a poly(alkylene oxide) oligomer and a halogenated aromatic phthalic acid ester of a primary alcohol.

DETAILED DESCRIPTION OF THE INVENTION

The composition of the invention comprises a polycarbonate resin and a stabilizing agent in an amount sufficient to enhance the resistance of the resin to yellowing upon exposure to ionizing radiation. Preferably, the composition contains about 0.01 to 5.0, more preferably 0.1 to 3.0 percent of the stabilizing agent.

The polycarbonate resins useful in the practice of the invention are homopolycarbonates, copolycarbonates and terpolycarbonates or mixtures thereof. The polycarbonates generally have a weight average molecular weight of 10,000–200,000, preferably 20,000–80,000 and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, 1964, all incorporated herein by reference).

In the present context, dihydroxy compounds suitable for the preparation of the polycarbonates of the invention conform to the structural formulae (1) or (2)

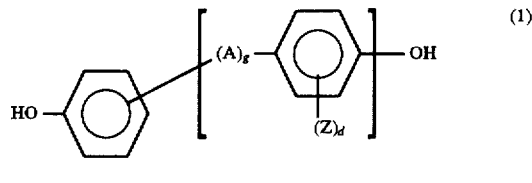

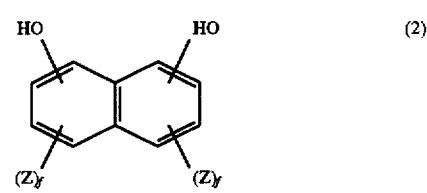

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —$SO_2$— or a radical conforming to

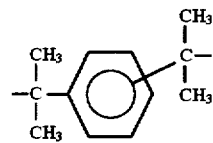

g and e both denote the number 0 to 1;

Z denotes F, Cl, Br or $C_1$–$C_4$-alkyl and if several Z radicals are substituents in one aryl radical, they may be identical or different one from the other;

d denotes an integer of from 0 to 4; and f denotes an integer of from 0 to 3.

Among the dihydroxy compounds useful in the practice of the invention are hydroquinone, resorcinol, bis (hydroxyphenyl) alkanes, bis(hydroxyphenyl) ethers, bis (hydroxyphenyl)ketones, bis(hydroxyphenyl) sulfoxides, bis(hydroxyphenyl)sulfides, bis(hydroxyphenyl)sulfones, and α,α'-bis(hydroxyphenyl)diisopropylbenzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis(4-hydroxyphenyl)-propane (bisphenol A), 2,4-bis(4-hydroxyphenyl)-2-methylbutane, 1,1-bis(4-hydroxyphenyl) cyclohexane, α,α'-bis(4-hydroxyphenyl)-p-diisopropylbenzene, 2,2-bis(3-methyl-4-hydroxyphenyl) propane, 2,2-bis(3-chloro-4-hydroxyphenyl)propane, bis(3,5-dimethyl-4-hydroxyphenyl)ethane, 2,2-bis(3,5-dimethyl-4-hydroxyphenyl)propane, bis(3,5-dimethyl-4-hydroxyphenyl)sulfide, bis(3,5-dimethyl-4-hydroxyphenyl) sulfoxide, bis(3,5-dimethyl-4-hydroxyphenyl)sulfone, hydroxybenzophenone, 2,4-bis(3,5-dimethyl-4-hydroxyphenyl)cyclohexane, α,α'-bis(3,5-dimethyl-4-hydroxyphenyl)-p-diisopropylbenzene and 4,4'-sulfonyl diphenyl.

Examples of particularly preferred aromatic bisphenols are 2,2-bis(4-hydroxyphenyl)propane, 2,2-bis(3,5-dimethyl-4-hydroxyphenyl)propane and 1,1-bis(4-hydroxyphenyl) cyclohexane.

The most preferred bisphenol is 2,2-bis(4-hydroxyphenyl)propane (bisphenol A).

The polycarbonates of the invention may entail in their structure units derived from one or more of the suitable bisphenols.

The resins suitable in the practice of the invention include phenolphthalein based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri(4-hydroxyphenyl)heptane; 1,3,5-tri(4-hydroxyphenyl)-benzene; 1,1,1-tri(4-hydroxyphenyl)ethane; tri(4-hydroxyphenyl)phenylmethane; 2,2-bis[4,4-(4,4'-dihydroxydiphenyl)-cyclohexyl]propane; 2,4-bis(4-hydroxy-1-isopropylidine)phenol; 2,6,-bis-(2'-dihydroxy-5'-methylbenzyl)4-methylphenol; 2,4-dihydroxybenzoic acid; 2-(4-hydroxyphenyl)-2-(2,4-dihydroxyphenyl)propane and 1,4-bis(4,4'-dihydroxytriphenylmethyl)benzene. Some of the other polyfunctional compounds are 2,4-dihydroxybenzoic acid, trimesic acid, cyanuric chloride and 3,3-bis(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2500 and Makrolon 3200, all of which are bisphenol A based homopolycarbonate resins differing in terms of their respective molecular weights and characterized in that their melt flow indices (MFR) per ASTM D-1238 are about 19, 11, 15 and 4 g/10 min., respectively. These are products of Miles Inc. of Pittsburgh, Pa.

The stabilizer of the invention is an ester based on an aromatic carboxylic acid and at least one alcohol selected from the group consisting of secondary alcohol, benzyl alcohol and tertiary alcohol. Preferably, the number of carbon atoms of the alcohol should be limited only in so far as it might effect the optical property of the composition. Most preferably, the number of carbon atoms of the alcohols should be in the order of about 3 to 50, most advantageously 3 to 30 carbon atoms. Examples of suitable alcohols include isopropyl alcohol, isobutyl alcohol, tertiary butyl alcohol, benzyl alcohol and cyclohexyl alcohol.

Examples of suitable aromatic carboxylic acids include phthalic acid, terephthalic acid, isophthalic acid, trimellitic acid, trimesic acid, pyromellitic acid and naphthalic acid.

The preparation of esters suitable in the present context is conventional and is well known in the art.

In the practice of the invention, the stabilizer is added to the polycarbonate resin at a level of 0.05 to 5, preferably 0.1 to 3.0 percent relative to the weight of the composition, via extrusion techniques. Once extruded, the composition may be molded by conventional methods for molding of thermoplastics.

Conventional additives may also be incorporated in the composition for their art-recognized utility. These include release agents, plasticizers, thermal and UV stabilizers, antioxidants, fillers, reinforcements and the like. Among the useful thermal stabilizers are hindered phenols, phosphines, phosphites, phosphates and sulfides which may advantageously be added to the stabilized composition of the invention.

The invention is further illustrated but is not intended to be limited by the following examples in which all the amounts are by weight percent unless otherwise specified.

EXAMPLE

Experimental

A representative stabilizer of the invention, dicyclohexyl phthalate, was incorporated in a polycarbonate resin, a homopolycarbonate based on bisphenol-A, having a melt flow index of about 11 g/10 min. per ASTM D-1238. The components were tumble blended and then extruded and pelletized in a conventional manner. Specimens measuring about 7.5×5×0.25 cm. were prepared by injection molding (at 288° C.) and their yellowness index (YI) determined in accordance with ASTM D-1925. YI before irradiation ($YI_0$) was determined. The specimens were then exposed to gamma radiation at a dose of 3 Mrad. The irradiated specimens were stored in the dark for six days before determining their yellowness index ($YI_6$). The change in yellowness indices is indicative of radiation resistance; the smaller the difference in YI, the better the resistance.

Table 1 below summarizes the results of the evaluation.

TABLE 1

| Example | A | B | C | D |
| --- | --- | --- | --- | --- |
| stabilizer added, % | 0.0 | 0.4 | 0.9 | 1.5 |
| $YI_0$ | 2.8 | 3.0 | 2.9 | 3.0 |
| $YI_6$ | 25.3 | 12.9 | 10.0 | 8.9 |

The results show that the ester of the invention imparts to the polycarbonate resistance to discoloring caused by exposure to gamma radiation.

The yellowness indices of the test specimens of the compositions A through D above were monitored over a period of 14 days after irradiation during which time the specimens were kept in darkness. The yellowness indices were determined at 7, 10, 12, 14, and 19 days after irradiation. The results show that the YI of the compositions of the invention B, C and D remain practically unchanged over the period. In contrast, the control composition A shows a considerable decline over the test period from a value of about 25 to about 19.

An additional set of experiments compared the radiation resistance of compositions in accordance with the invention to corresponding compositions which contained esters based on primary alcohols. Test specimens were prepared following the procedure described above, and were irradiated at a dose of 3.3 Mrad. Table 2 shows the yellowness indices of non-irradiated samples ($YI_0$) and irradiated samples after 1 and 5 days dark storage ($YI_1$ and $YI_5$, respectivelly). In the table, esters within the scope of the invention are dicyclohexyl phthalate (referred to as DCHP) and phthalate of benzyl alcohol and 3-hydroxy-1-isopropyl-2,2-dimethylpropyl ester isobutyrate (referred to as BZP). The comparative examples entail esters based on primary alcohols which are outside the scope of the invention: trisiononyl trimellitate (referred to as TRM) and ditridecyl phthalate (referred to as DTP).

TABLE 2

| Example | $YI_0$ | $YI_1$ | $YI_5$ |
|---|---|---|---|
| control (no additive) | 4.2 | 35.8 | 26.3 |
| 0.5% DCHP | 5.3 | 23.4 | 16.1 |
| 0.8% DCHP | 3.9 | 15.5 | 10.8 |
| 1.0% BZP | 2.5 | 25.4 | 15.8 |
| 1.5% BZP | 2.3 | 26.6 | 16.2 |
| 1.0% TRM | 3.4 | 32.4 | 22 |
| 1.5% TRM | 3.6 | 32 | 21.3 |
| 1.0% DTP | 2.5 | 33.1 | 21.8 |
| 1.5% DTP | 2.4 | 32 | 20.3 |

Differences noted between the $YI_0$ values of closely related compositions, are believed attributable to experimental variations having no relevance to the inventive findings.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition having improved resistance to yellowing caused by exposure to gamma radiation comprising (i) a resinous component consisting of an aromatic polycarbonate resin and (ii) about 0.1 to 3.0% relative to the weight of said polycarbonate, of dicyclohexyl phthalate.

2. A thermoplastic molding composition having improved resistance to yellowing caused by exposure to gamma radiation consisting essentially of (i) an aromatic polycarbonate resin and (ii) about 0.1 to 3.0% relative to the weight of said polycarbonate, of dicyclohexyl phthalate.

* * * * *